(12) United States Patent
Daubert et al.

(10) Patent No.: US 7,246,008 B2
(45) Date of Patent: *Jul. 17, 2007

(54) HIGH RESOLUTION TRACKING OF MOBILE ASSETS

(75) Inventors: Robert H. Daubert, Melbourne, FL (US); Thomas F. Doyle, San Diego, CA (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/180,898

(22) Filed: Jul. 13, 2005

(65) Prior Publication Data

US 2006/0080035 A1    Apr. 13, 2006

Related U.S. Application Data

(62) Division of application No. 10/238,842, filed on Sep. 9, 2002, now Pat. No. 6,920,391.

(60) Provisional application No. 60/318,738, filed on Sep. 12, 2001.

(51) Int. Cl.
*G01C 21/00* (2006.01)

(52) U.S. Cl. .................. 701/200; 701/207; 701/208; 701/300; 340/995.19; 340/995.27

(58) Field of Classification Search ............... 701/200, 701/201, 207, 208, 211–212, 213, 300; 340/988, 340/995.19, 995.27, 990
See application file for complete search history.

(56) References Cited

U.S. PATENT DOCUMENTS

| 5,712,899 A * | 1/1998 | Pace, II | 455/456.2 |
| 6,081,206 A * | 6/2000 | Kielland | 340/937 |
| 6,339,745 B1 * | 1/2002 | Novik | 701/208 |

* cited by examiner

*Primary Examiner*—Gertrude A. Jeanglaude
(74) *Attorney, Agent, or Firm*—Drinker Biddle & Reath LLP

(57) ABSTRACT

A system and method for describing local area geo-reference features and landmarks in providing high resolution asset location information. Geo-image data is integrated to a mapping application and geo-reference data to add more detailed scale levels to the map. The geo-image data includes geo-images and its features to provide more detailed references to the asset and support the larger references of the geo-reference data. To describe a geo-reference landmark, an original landmark representation is selected with a center point and a radius. The asset location points located at the original landmark representation are compiled along with the asset location points generated by events occurring at the landmark to create a point set. The point set replaces the original landmark representation when a prescribed number of points is reached. The asset location points that are within a specified distance from any of the points in the point set are added to the point set to complete the landmark representation. The geo-image data and landmark representation data are combined to provide high resolution asset location information.

13 Claims, 5 Drawing Sheets

HIGH RESOLUTION TRACKING OF MOBILE ASSETS

RELATED APPLICATION

This application is a divisional of U.S. application Ser. No. 10/238,842, filed Sep. 9, 2002, now U.S. Pat. No. 6,920,391, which claims the benefit of U.S. Provisional Application No. 60/318,738, filed Sep. 12, 2001. The entire teachings of the above applications are incorporated herein by reference.

BACKGROUND OF THE INVENTION

Tracking assets using Global Positioning System (GPS) technology is becoming widely used. However, for most users, latitudinal and longitudinal coordinates are generally not a very useful form of location information. Instead, it is more useful for users to have the coordinates provided in reference to one or more features or landmarks that are commonly known.

In most regions of the world, there exists so-called "geo-reference data" that provides the coordinates of well known features and landmarks, such as roads, rail lines, topology, land use and place descriptions. By combining the coordinates of a tracked asset with information about nearby geo-reference features and landmarks a useful description of the asset location can be created. For example, by incorporating the relevant geo-reference data, location information may be given in the following forms: "12.6 miles southeast of Gary, Ind.; 112 meters out of 629 Rockledge Drive, Rockledge, Fla.," or "¼ mile from the peak of Mount Everest."

Such location information may be provided graphically on electronic maps, in text or in other data format. These kinds of descriptions are readily understood as long as the selection of geo-reference features and presentation methods are appropriate for users.

Several approaches have been adopted for representing geo-reference features and landmarks. One approach is to represent landmarks such as cities as a point. Alternatively, it is also common to describe landmarks in more detail as a defined area. In the simplest form, a landmark area can be defined as a center point with a radius. Such a description provides a user with more detail information, such as whether an asset is located at the landmark. That is, whether the coordinates of the asset are within the defined area of the landmark. For example, one can determine whether a trailer asset is in a trailer yard by first describing the yard as a center point with a radius. Then the asset is checked to see if it is within the radius. If the asset is within the radius then the asset is located at the landmark.

SUMMARY OF THE INVENTION

However, the geo-reference features and landmarks described above are not sufficiently precise or detailed to provide a high resolution description of the asset location. In particular, when large groupings of assets exist or when assets are stored in an area where the view of access to an asset may be obstructed from one or more perspectives, then there is a need for more precise and detailed geo-reference features or landmarks. For example, trailers or containers are often stored in yards where dozens or even hundreds of similar looking assets are stored. In other instances, they may be in yards that are proximate but separated by walls or fences. In these cases, without a proper geo-reference landmark or feature, finding a single trailer or container is a challenge that takes a significant amount of time.

Although the accuracy of GPS coordinates now supports more accurate description of where a particular asset is, the problem of appropriate referencing must be considered. Since the US government has eliminated the signal degradation that traditionally limited standard commercial GPS to approximately 100 meters accuracy with 95% confidence, the accuracy of standard GPS receivers has increased greatly. Standard GPS now provides accuracy to within 10 meters with 95% confidence. Without detailed local area geo-reference characteristics or landmarks that have the same or better degree of accuracy as the asset coordinates, it is difficult to create a high resolution description of the asset location.

Thus, there is a need for a system to provide a detailed description and representation of local area geo-reference features and landmarks to create a high resolution description of the asset location.

The present invention provides graphical and programmatic methods for highly accurate description and display of landmarks. An accurate association of assets with the landmarks is facilitated. In addition, these advantages are provided with a minimum burden on users to set up or maintain data. These methods are highly effective in providing high resolution asset tracking with high value to users.

Recent technological advances and increasing availability in detailed geo-imaging present one tool for high resolution asset tracking. The present invention provides a system and method for a high resolution description of the asset location. According to one aspect, high resolution geo-image data is integrated to a mapping application and a geo-reference data set so that the high resolution geo-images may be viewed in the mapping application along with the geo-reference features and landmarks. The high resolution geo-images provide a more detailed scale level of references than the existing geo-reference features and landmarks. The coordinates of a mobile asset are tracked and captured in the mapping application. The location of the mobile asset is provided in reference to one or more geo-references including geo-reference features, landmarks, and high resolution geo-images.

The high resolution geo-images are available as geo-references for asset tracking. The high resolution of geo-images may be automatically labeled by the mapping application. Alternatively, the labeling of geo-images may be done manually by the user. The user may identify a feature of a geo-image by a pointing device and label the feature.

The present invention also provides a system and method for representing a geo-reference landmark. An original landmark representation is created with a center point and a radius. A set of asset location points is created by compiling the asset location points that are at the original landmark representation and the asset location points that are generated by events that only occur at the landmark. An asset location point that is the same as a previous asset location point is excluded from the set of asset location points. The original landmark representation is replaced with the set of asset location points when a minimum number of points and a point density is obtained.

In specific embodiments, the asset location points that are within a specified distance of one of the points in the set of asset location points are added to the set of asset location points.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
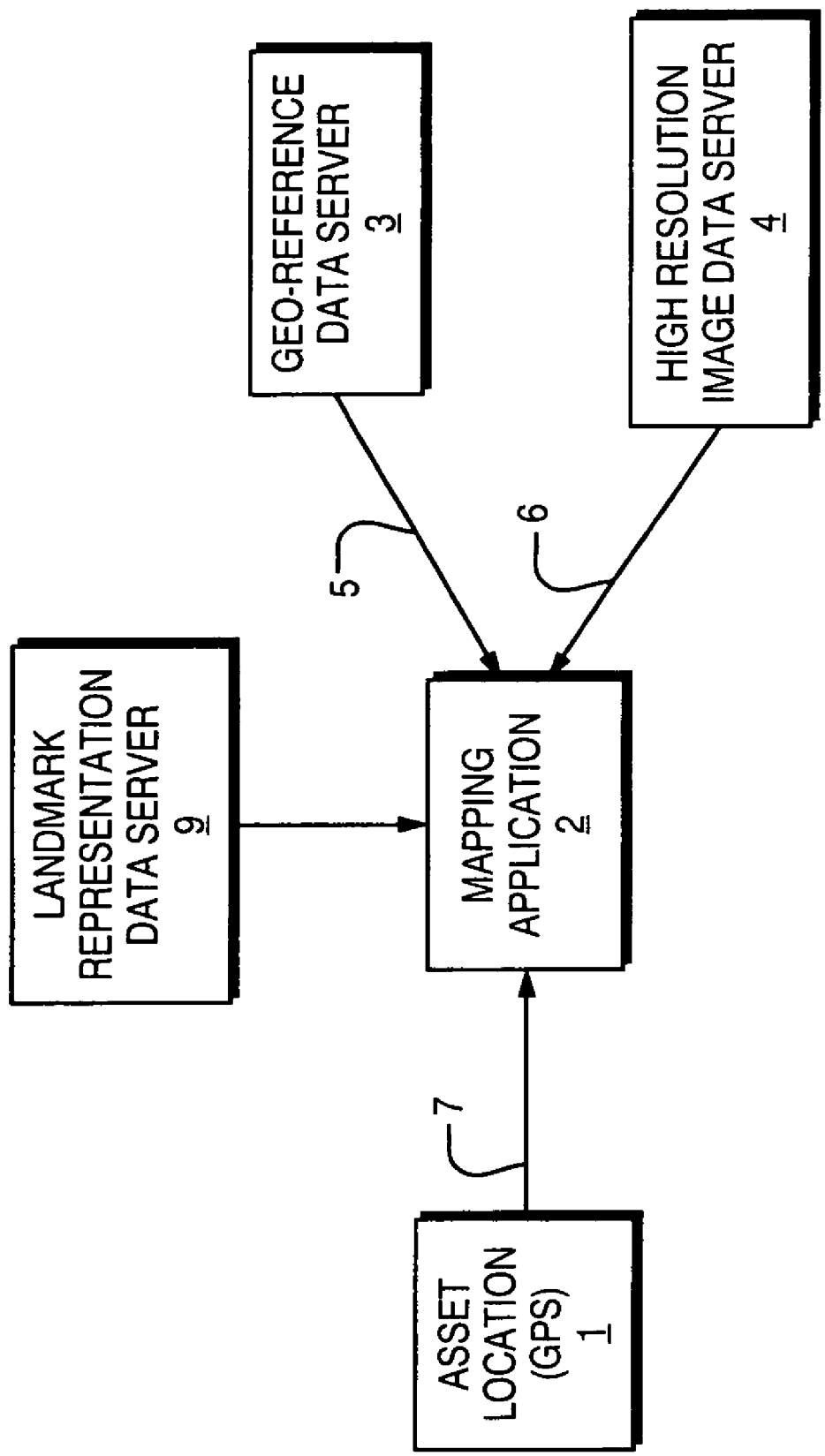
FIG. 1 is a block diagram illustrating a high resolution asset tracking system according to the present invention.

FIG. 1 is a block diagram illustrating a high resolution asset tracking system according to the present invention. The high resolution asset tracking system includes an asset location system 1, such as the Global Positioning System (GPS), to provide the coordinates 7 of an asset, a geo-reference data server 3 to provide geo-reference data 5 of well known features and landmarks, a geo-image data server 4 to provide geo-image data 6 of high resolution geo-images, and a landmarks representation data server 9. The high resolution asset tracking system also includes a mapping application 2 integrating the coordinates of the asset and the data from geo-reference data server 3 and geo-image data server 4, to provide a high resolution description of asset location.

The geo-image data 6 provides more detailed reference information than geo-reference data 5. The geo-image data 6 is integrated with the coordinates 7 of the asset 40 and geo-reference data 5 by matching the coordinates and presenting the high resolution geo-images on a map. The geo-image data 6 may be resident on the same computer as the mapping application 2 or as the geo-reference data 5. The geo-image data 6 also can be provided on a remote server 4 via the Internet or company intranet.

Figure 2A:
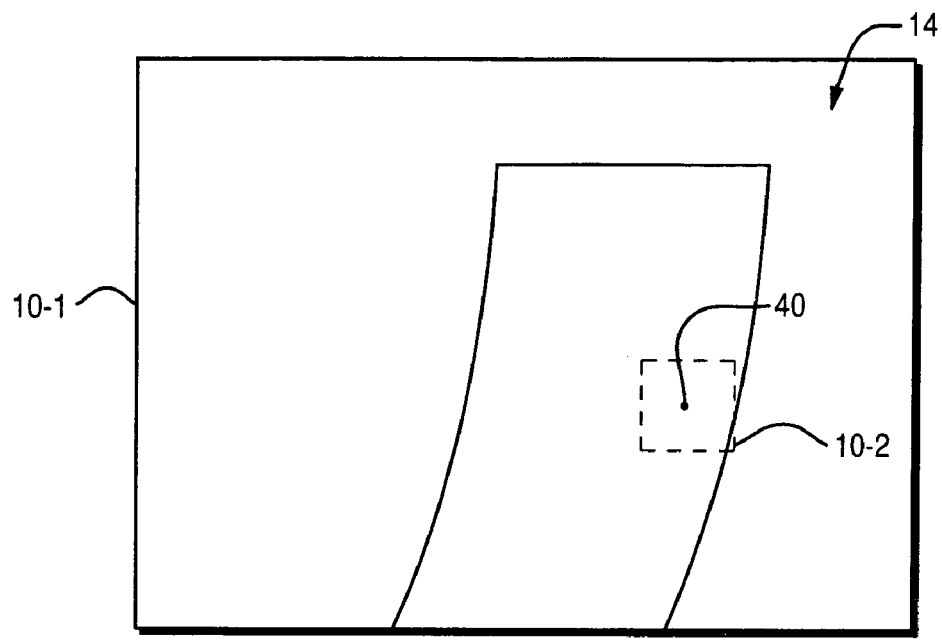
FIGS. 2A–2E illustrate maps of an asset at different zoom levels provided by the high resolution asset track system of FIG. 1.
Figure 2B:
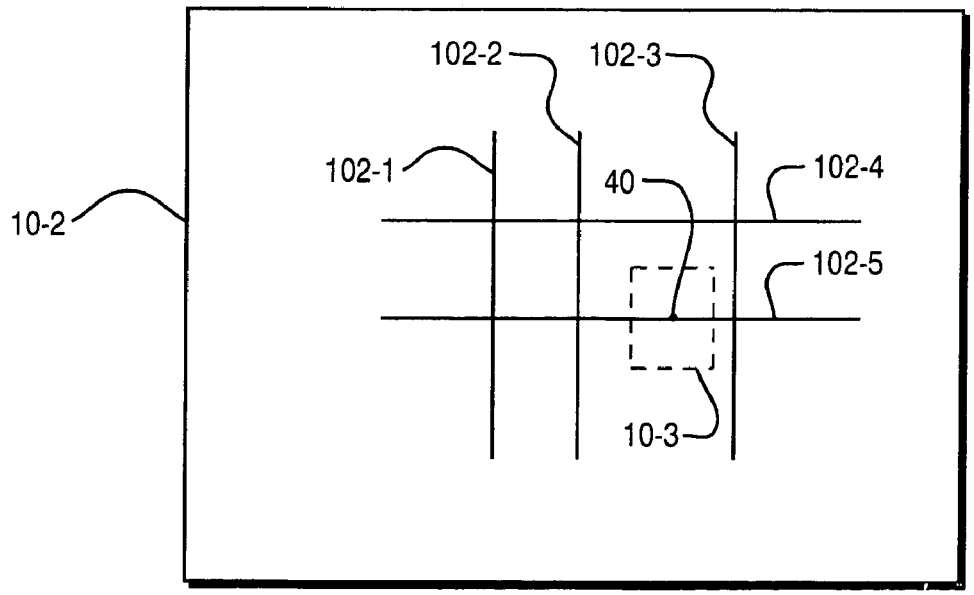
Figure 2C:
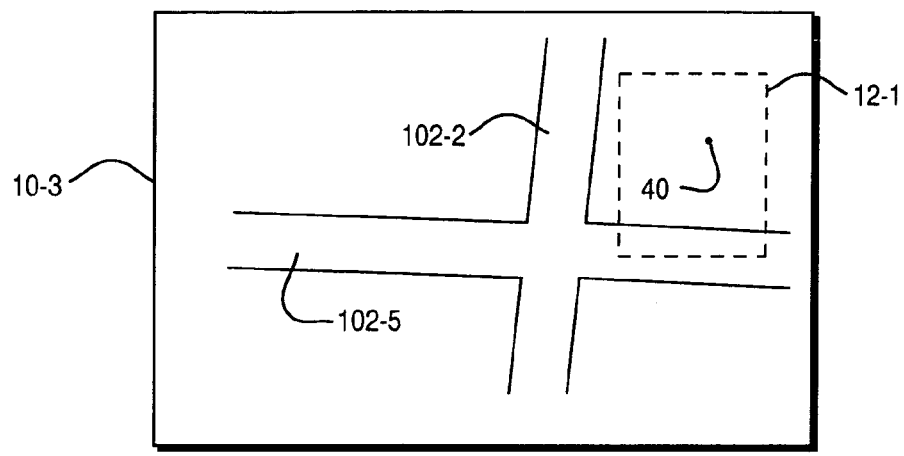
Figure 2D:
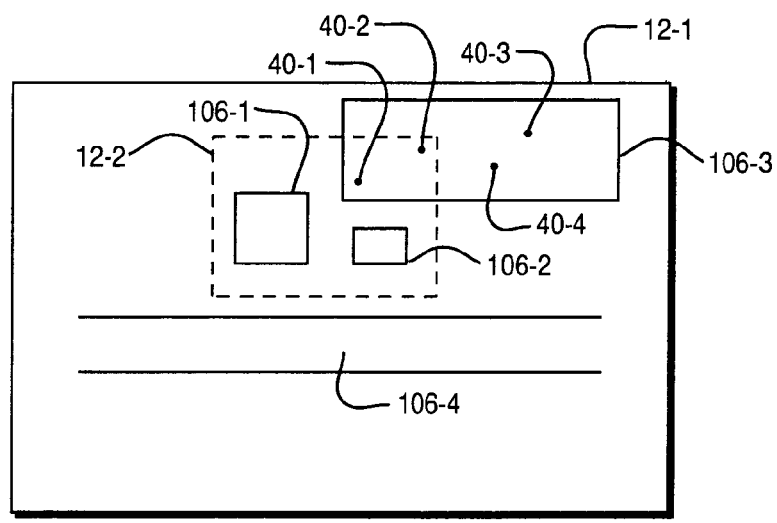
Figure 2E:
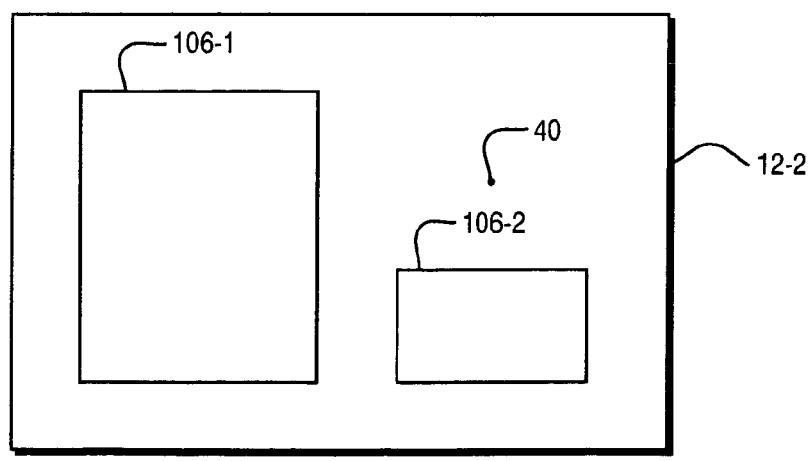

FIGS. 2A–2E are maps showing the location of an asset at different zoom levels provided by the high resolution asset track system shown in FIG. 1. In particular, FIGS. 2A–2C are maps supported by geo-reference data 5. FIGS. 2D–2E are maps supported by geo-image data 6. Using existing methods for presenting a mobile asset 40 on a map 14, the user may navigate maps at different zoom levels. For example, the user may zoom in and out of geo-reference zoom levels 10-1, 10-2, 10-3 and geo-image zoom levels 12-1, 12-2. The mapping application 2 may provide multiple zoom levels 10-1, 10-2, 10-3 . . . 10-N for a geo-reference and 12-1, 12-2, 12-3 . . . 12-N for a geo-image.

The mapping application also provides for a user to navigate between geo reference zoom levels 10-1, 10-2, 10-3 and geo-image zoom levels 12-1, 12-2. For example, the user may zoom in to the maximum geo-reference zoom level 10-3 and if the user wants to zoom in further for more detailed description, then maps supported by geo-image data 6 are provided. FIGS. 2D and 2E are maps at geo-image scale levels 12-1 and 12-2 illustrating a geo image 104.

Referring to FIGS. 2A–2C, the location of the asset 40 is illustrated at different geo-reference zoom levels 10-1, 10-2, 10-3. The maps at zoom levels 10-1, 10-2, and 10-3 illustrate the asset 40 in reference to geo-references 102. For example, FIGS. 2B and 2C illustrate the asset 40 in reference to various roads 102-1, 102-2, 102-3, 102-4, 102-5. Geo-references may also include other features such as cities and well known landscapes.

FIGS. 2D and 2E show the location of the asset 40 in reference to geo-image features provided by the geo-image data 6. The geo-image features 106 form the basis for a high resolution reference for the location of an asset and supplement larger scale geo-references such as cities.

The geo-image features 106 may be detected and labeled from geo-images. An extensive technology exists for analysis of geo-images and to infer various structures and features 106 within a high resolution geo-image. For example, shapes of buildings 106-1, 106-2 can be determined by software that exists for image analysis. Other shapes such as roads 106-4, railways, parking lots 106-3 can be reliably detected with the state of the art image processing software. The application provider or the user may select geo-images to be analyzed. The image analysis software is applied to the selected geo-images to detect features in the geo-images and provide coordinates of features 106. In addition, the software may determine the category of a feature 106 and label it to the extent possible.

The labeling and detecting of the geo-image features 106 may also be performed by the user. The user views a geo-image 104, identifies a feature 106 with a pointing device on a graphics display, and labels the feature 106. The coordinates of the full feature 106 are captured by repeating the process.

Referring to FIG. 2E, by adding such a detailed feature 106-1, an asset location can be provided as follows: Trailer 40: 12.4 miles southeast of Rockledge, Fla., 0.1 miles from a building 106-1, 170 feet northwest of a garage 106-2. In the example, the user identified and labeled the garage 106-2. The software detected and labeled the building 106-1.

When graphically presenting asset tracking information, an icon may be placed on the map image by providing an appropriate description of the asset location. The description includes a timestamp of the location and information regarding the type of icon or symbol to be used in presenting the asset. The user may then view the asset in the context of its surroundings as represented by the mapping application and its data set. In addition, the mapping application 2 may enable zooming and panning of the images. The user may control the level of detail and type of attributes displayed to create a view that fits their needs.

When presenting asset information using text or other data references, application rules may be provided to automatically select a type of references for a particular asset by taking into consideration the asset type, status, operational considerations, the user, and other factors. The user may also select one or more of references for a particular asset.

In the high resolution asset tracking system, a landmark representation that supports the identification of detailed local features as described above is also useful to optimize the accuracy of determination of assets at a landmark.

Figure 3:
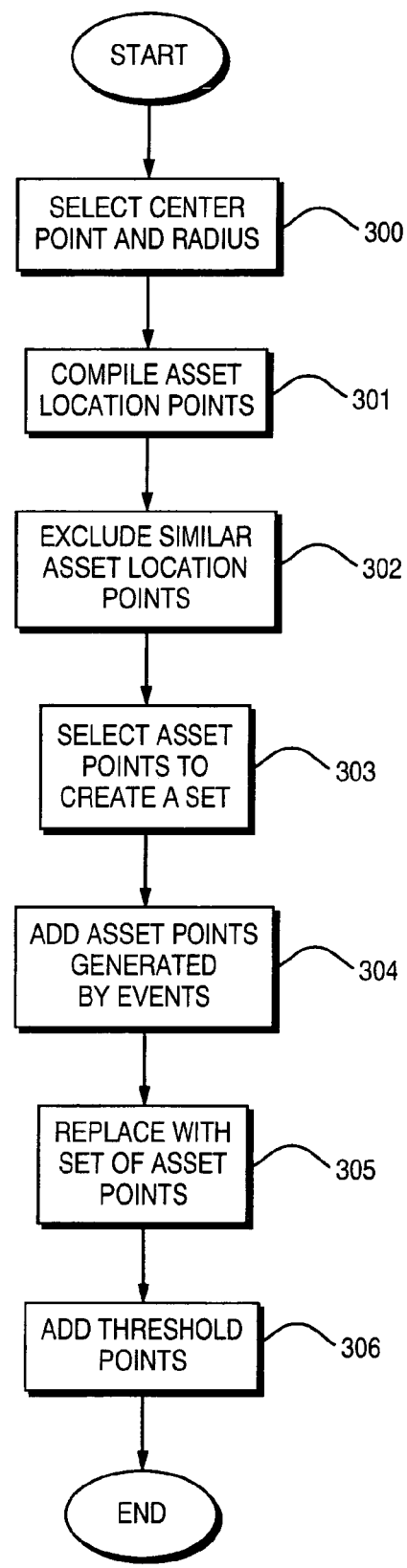
FIG. 3 is a flow diagram illustrating a method for representing a landmark.
Figure 4:
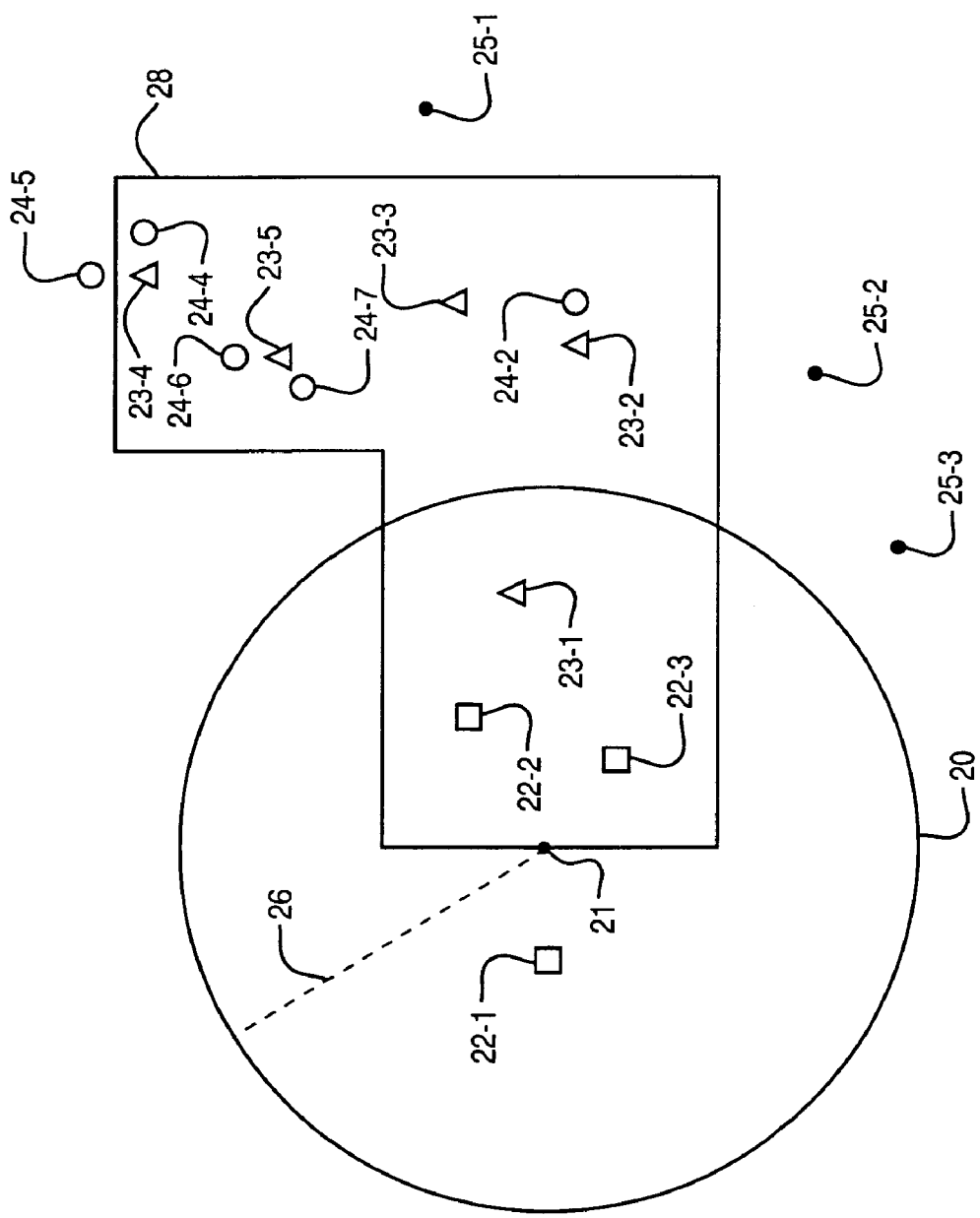
FIG. 4 is a diagram illustrating an original landmark representation and a high resolution landmark representation of FIG. 3.

FIG. 3 is a flow diagram illustrating one of the preferred methods for representing a landmark using location reports transmitted from tracked assets. The location reports are used to build an asset location point set. Over time, the compilation of the point set resulting from the asset location reports describes the actual shape of the landmark. FIG. 4 is a diagram illustrating the original landmark representation and the high resolution landmark representation of the method for representing a landmark shown in FIG. 3.

The high resolution land mark representation begins at step 300. In step 300, a landmark, such as a parking lot, is initially represented with a spatial representation such as a center point 21 and a radius 26, creating an original landmark representation 20. Assuming that the center point 21 is located within the boundaries of the landmark 28, asset location reports begin to accrue. The asset location points 22, 23, 24 and 25 generated from these asset location reports are compiled in step 301.

In step 302, duplicate points are avoided by excluding any new points whose coordinates are within a specified tolerance of a previous point. In step 303, all points 22 that are within the original landmark representation 20 are selected to create a set of asset location points.

In step 304 all points 23 that are generated by events occurring at the landmark 28 are added to the point set. Certain events that generate location reports can be inferred to occur at the landmark 28. For example, if the door of a trailer opens then it is determined that it is at the location because it normally occurs at a landmark rather than on the road. When the point set obtains a prescribed minimum number of points and point density then the original spatial representation 20 of the landmark 28 is replaced with the point set in step 305.

Concurrently, the system changes to a different algorithm for determining whether an asset is at the landmark 28. The determination of whether an asset is located at the landmark is now based on whether the asset is within a specified distance of any of the points in the point set. In step 306, any points 24 that are within the new at tolerance from the point set are selected and added to the point set. Steps 301, 302, 304 and 306 can be repeated to add more asset points to the set for more accurate high resolution landmark representation.

If the number of points is sufficient, the accuracy of location determination can approach the GPS tolerance of 10 meters. Therefore, utilizing a point set in this manner has the potential to resolve asset location at the landmark within 10 meters.

The post editing of the landmark point set by the user is available in various ways. In particular, a graphic user interface allows point and click selection and deselecting of points that are considered to be in or out of the set. Furthermore, points that are left out of the point set comprising a landmark description can be selected and established as another landmark 28 where appropriate. In this manner, points that may have been near a landmark but actually from a proximate landmark can be separated and defined as a new landmark.

These landmarks, which are similar to bit-mapped images, can be converted to vector based representations. Abstracted in this fashion the landmark descriptions represent reduced sized data sets amenable to transmission via various means and requiring significantly less data storage.

If a landmark spatial description is achieved which is representative of the actual size and shape of the landmark, then detection and definition of features or characteristics is done in a manner analogous to that proposed above for high resolution geo-images. Shapes are identified from the point set and labeled, both manually through a user interface or programmatically using software for analyzing the patterns of the point sets. Upon defining and labeling one or more landmark features, asset locations can be described with high resolution referencing detail as described above.

The techniques above provide a method for highly accurate spatial descriptions of landmarks and for highly accurate determination of which assets are at the landmark with minimal user intervention.

The two methods of landmark representation presented above can be combined to provide spatial information of extraordinary utility for asset management. The features that emerge from the landmark based upon asset tracking is used to validate the geo-images, which may be incomplete or dated, depending on the source. This reconciliation may be done visually by means of an overlay process. Alternatively, the feature detection technologies applicable to geo-images and the programmatic analysis of the tracking based data is integrated to automate the process.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for describing the location of a mobile asset comprising:
    (a) providing geo-image data to a mapping application to present at least one geo-image reference in a map of the mapping application;
    (b) matching mobile asset location data to coordinates of the geo-image data to present the mobile asset in the map of the mapping data; and
    (c) providing a location of the mobile asset in reference to the at least one geo-image reference in the map by providing a distance from the at least one geo-image reference to the mobile asset location.

2. A method as in claim 1 wherein the method further comprising the step of detecting features in a geo-image to provide the at least one geo-image reference.

3. A method as in claim 2 wherein the method further comprising the step of labeling one or more detected features of the at least one geo-image reference.

4. A method as in claim 1 wherein the at least one geo-image reference is a building, a parking lot, a garage or a road.

5. A method as in claim 2 further comprising the step of integrating geo-reference data to the mapping application to present at least one geo-reference in the map.

6. A method as in claim 5 further comprising the step of providing the location of the mobile asset in reference to the at least one geo-reference reference.

7. A method as in claim 5 wherein the at least one geo-reference reference is a city, a town or a landmark.

8. A method as in claim 5 further comprising the step of providing the map at a plurality of zoom levels.

9. A method as in claim 8 wherein the plurality of zoom levels includes geo-reference zoom levels and geo-image zoom levels.

10. A method for describing the location of a mobile asset comprising:
    (a) providing geo-image data to a mapping application to present at least one geo-image reference in a map of the mapping application, the geo-image reference being a readily recognizable location, the readily recognizable location being selected from the group consisting of a building, a parking lot, a garage, a road, a city, a town or a landmark;

(b) matching mobile asset location data to coordinates of the geo-image data, the matching presenting the mobile asset in the map of the mapping data;
(c) providing a location of the mobile asset in reference to the at least one readily recognizable geo-image reference in the map;
(d) dynamically providing a mobile asset distance to the at least one geo-image reference to manage the mobile asset and to identify the mobile asset in location and identify the mobile asset in distance relative to the readily recognizable location as the mobile asset moves in position.

11. The method of claim 10 wherein the distance is accurate within about ten meters.

12. The method of claim 10 wherein the mobile asset is a transportation device.

13. The method of claim 10 wherein the mobile asset is a trailer.

* * * * *